United States Patent [19]

Rudoi

[11] Patent Number: 4,525,194
[45] Date of Patent: Jun. 25, 1985

[54] APPARATUS FOR SIMULTANEOUS PRODUCTION OF DOUBLE GLASS PANELS

[76] Inventor: Boris L. Rudoi, 1170 Chambers Rd., Columbus, Ohio 43212

[21] Appl. No.: 650,697

[22] Filed: Sep. 17, 1984

Related U.S. Application Data

[63] Continuation of Ser. No. 501,652, Jun. 6, 1983, abandoned.

[51] Int. Cl.³ .............................................. C03B 17/00
[52] U.S. Cl. ........................................ 65/145; 65/121; 65/183; 65/187; 65/204; 65/258; 65/195
[58] Field of Search ................. 65/121, 145, 153, 183, 65/187, 204, 245, 255, 258, 325, 326, 195

[56] References Cited

U.S. PATENT DOCUMENTS

| | | | |
|---|---|---|---|
| 1,673,907 | 6/1928 | Ferngren | 65/325 X |
| 1,734,964 | 11/1929 | Danner | 65/121 X |
| 1,759,229 | 5/1930 | Drake | 65/325 X |
| 1,805,250 | 5/1931 | Mambourg | 65/258 X |
| 1,872,542 | 8/1932 | Wilcox | 65/187 |
| 2,052,269 | 8/1936 | Woods | 65/145 |
| 3,149,949 | 9/1964 | Dockerty et al. | 65/121 X |
| 3,338,696 | 8/1967 | Dockerty | 65/145 |
| 3,433,613 | 3/1945 | Dockerty | 65/145 |
| 3,723,082 | 3/1973 | Knowles et al. | 65/204 X |
| 4,204,027 | 5/1980 | Simon | 65/121 X |

FOREIGN PATENT DOCUMENTS 563365 8/1977 U.S.S.R. .

Primary Examiner—Robert Lindsay
Attorney, Agent, or Firm—Francis T. Kremblas, Jr.

[57] ABSTRACT

An apparatus and method for the continuous production of glass articles characterized by the ability to form a single sheet of glass having two layers of different compositions, double glass panels having an air space between the panels or to produce tubes having either circular or eliptical cross-sections. The apparatus and method utilizes a molding body having a trough means which may be used to divide the glass mass into two cooperating flows over the working surfaces of an upper and lower molding body portions. The glass mass flows downwardly along an outer working surface of the upper body portion onto the inner working surfaces of the lower portion. A nozzle means provided with a ceramic shell or other refractory material may be disposed in an opening provided in the bottom portion of the molding body to provide a means for forming a closed double panel of sheet glass or a tube shaped article. The configuration of the nozzle and the bottom opening in the molding body as well as the molding body as a whole may be changed according to the desired configuration of the article to be formed.

7 Claims, 22 Drawing Figures

APPARATUS FOR SIMULTANEOUS PRODUCTION OF DOUBLE GLASS PANELS

This is a continuation of application Ser. No. 501,652 filed June 6, 1983, now abandoned.

BACKGROUND

The continuous production of glass articles in the form of sheets or panels and tubes is well known. The industry has continually searched for new apparatus and methods which are more economical or produce a higher quality product.

However, none of the prior art methods are capable of producing a glass sheet for example, having one glass composition on one side thereof and a different, distinct glass composition on the other side. Further, no prior art methods are capable of forming double sheet glass panels or windows in a continuous method wherein each glass panel is simultaneously formed having an air space divider and closed end portions.

Further, some of the most widely used methods of producing glass tubes require relatively expensive feeder apparatus which are necessary to maintain the proper temperature of the glass batch entering the forming station to produce high quality glass articles.

The present invention provides a method and apparatus which offers significant advantages and enhanced capabilities for producing such glass articles in an economical manner.

SUMMARY OF THE INVENTION

The present invention relates generally to an appratus and method for the continuous production of glass or glass-ceramic articles in sheet panel or tube form. The apparatus comprises a molding body which preferably include separate top and bottom portions which cooperate to form the desired shape. The molding body also provides a significantly improved path for the glass flow during the forming process in a manner which eliminates the need for a costly feeder apparatus commonly necessary in prior processes to maintain proper temperature of the glass mass. The upper portion of the molding body includes a trough means for receiving the molten glass mass. The overflow of the glass from the trough means is separately communicated with each of the diverging wall means of this upper portion to flow downwardly to a point where the flow falls upon the converging wall means of the bottom portion of the molding body. The glass mass then flows downwardly upon the converging wall means of this lower or bottom portion. When sheet products are produced the glass flowing downwardly meets at a point near the exit opening formed at the termination of the converging wall means. The configuration of the top and bottom portions of the molding body and their wall means and the exit opening is shaped according to the desired form of the article being produced.

A nozzle means may be employed to cooperate with the conformation of the wall means of the molding body to produce a given article configuration and to provide proper cooling and an air space between the glass walls being formed.

Also, in accordance with another embodiment of the present invention, the trough means for receiving the glass mass may be provided with a divider wall to form two separate troughs. Then different compositions of glass may be fed into each trough to provide a glass sheet, tube or double glass panel, for example, which incorporates different glass compositions on each side of the final product.

OBJECTS

It is therefore an object of the present invention to provide an apparatus and method of making glass sheets or tubes which provides high quality and yet economical production.

It is another object of the present invention to provide an apparatus and method of the type described which is readily adaptable to changing component parts to accomodate a variety of shapes and sizes of given glass articles.

It is still another object of the present invention, in one of its embodiments, to provide an apparatus and method which produces, on a continuous basis, simultaneously formed double glass panels separated by an inner air space.

It is another object of the present invention, in one of its embodiments, to form single glass sheet products wherein the sheet product formed comprises two distinct layers of different glass compositions.

Further objects and advantages of the present invention will be apparent from the following descriptions, reference being had to the accompanying drawings wherein preferred forms of embodiments of the invention are clearly shown.

IN THE DRAWINGS

FIG. 1 is a front elevational sectional view of an apparatus for making sheet glass products constructed in accordance with the present invention, the section being taken along the centerline of the apparatus;

FIG. 1-A is a side sectional elevational view of the apparatus shown in FIG. 1, the section being taken along line A—A in FIG. 1;

DETAILED DESCRIPTION

Figure 2:
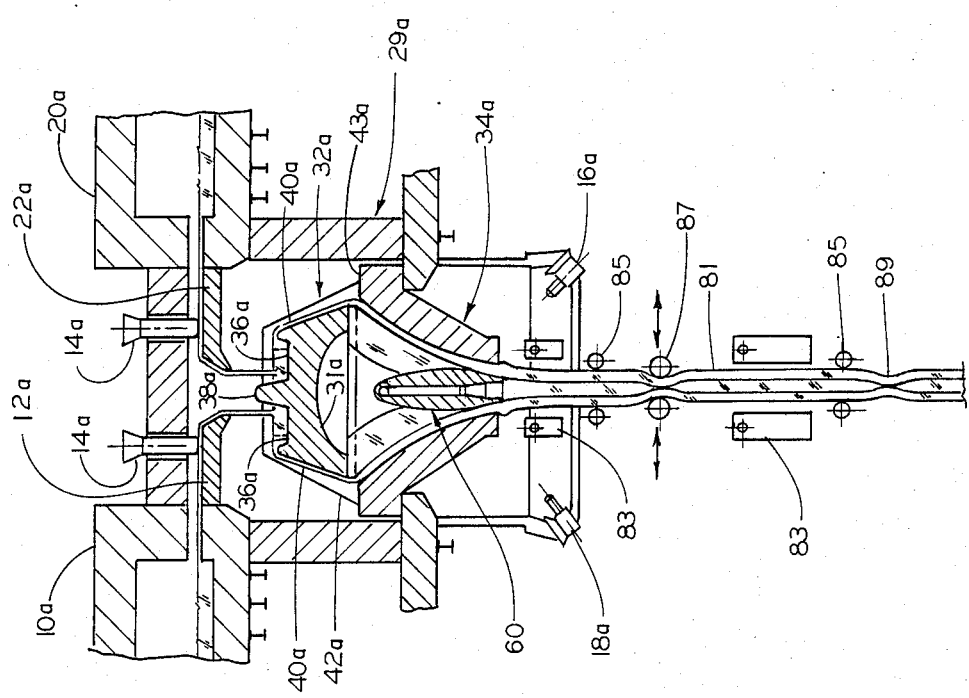
FIG. 2 is a front elevational sectional view of another embodiment of the apparatus for making glass products constructed in accordance with the present invention, the section being taken along the centerline of the apparatus.
Figure 1:
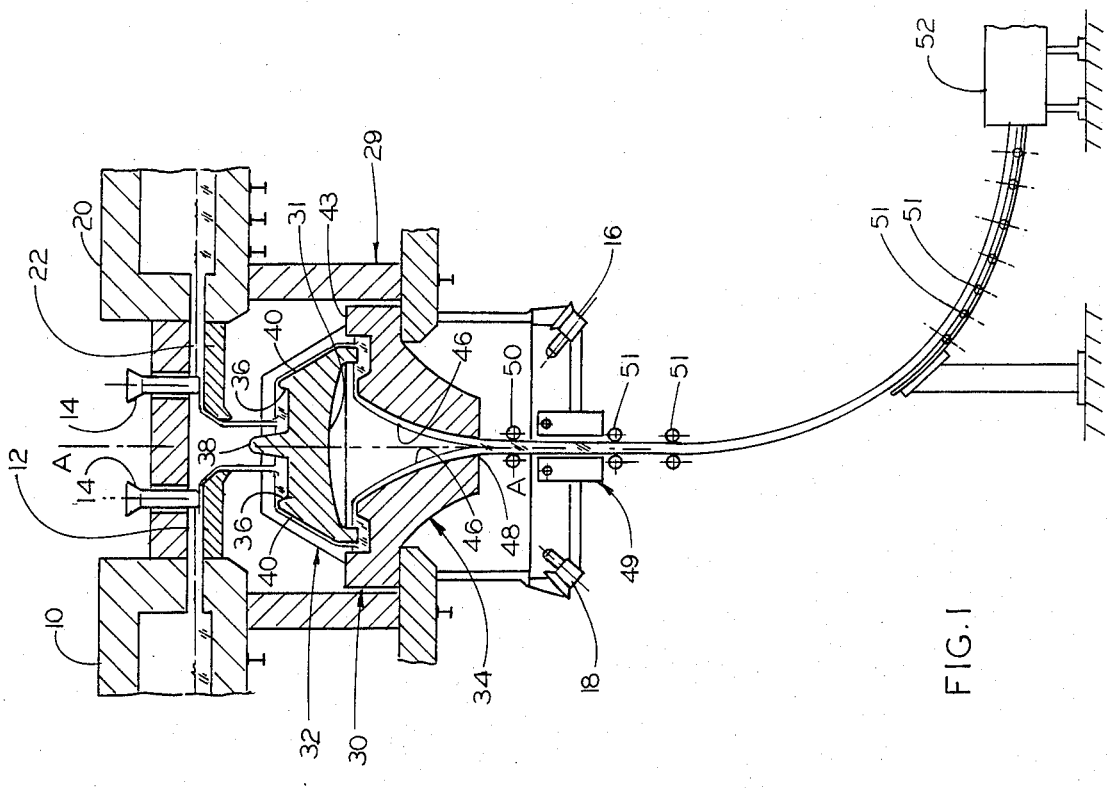
Figure 3:
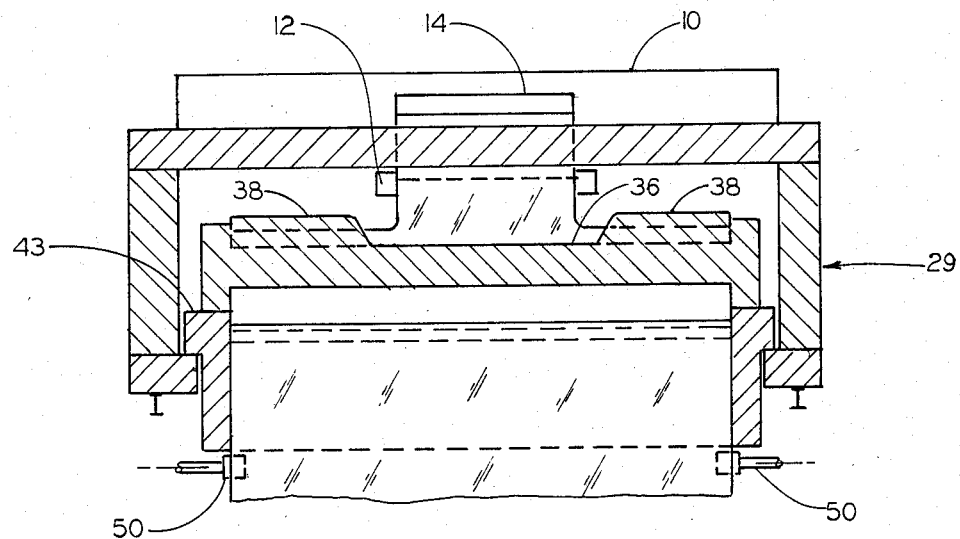
FIG. 3 is a front elevational sectional view of another embodiment of the apparatus for making glass products constructed in accordance with the present invention, the section being taken along the centerline of the apparatus.
Figure 3:
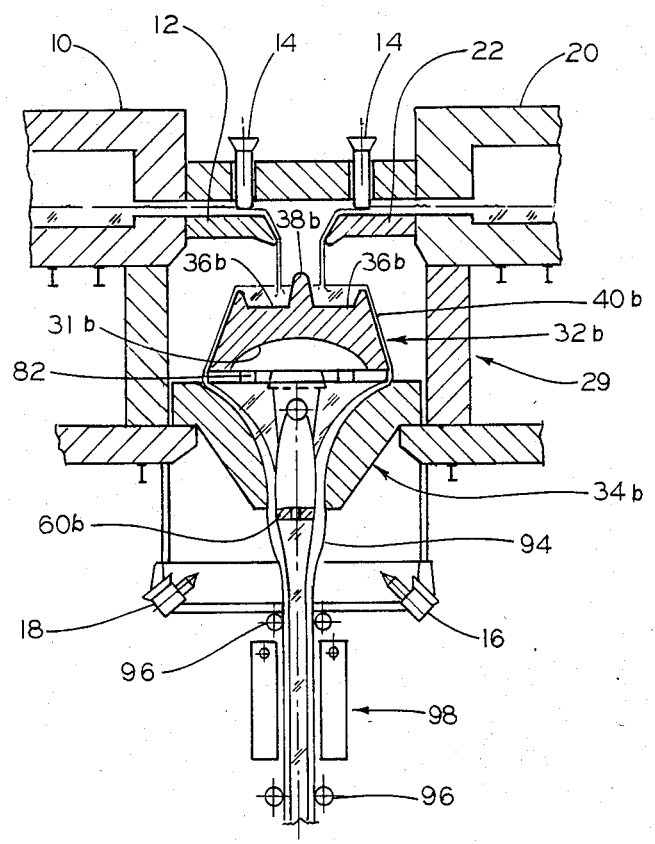

An apparatus and method for use in a continuous process for production of glass articles in sheet, double panels or tube form constructed in accordance with the present invention is shown in FIGS. 1-3 illustrating preferred embodiments of the present invention.

In the embodiment in FIG. 1, two separate glass furnaces are preferably employed, indicated generally at 10 and 20, to supply the molten glass mass from each furnace to a respective tray indicated at 12 and 22. A molding body 30 conventionally mounted within a refractory compartment indicated generally at 29, includes an upper portion 32 and a lower portion 34.

Figure 4:
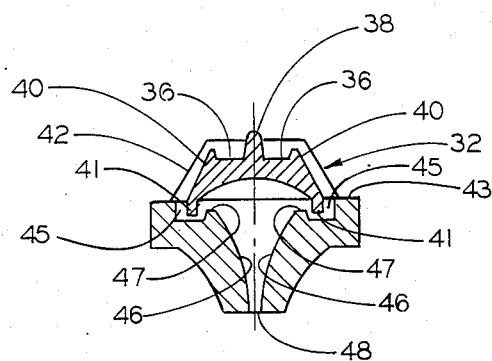
FIG. 4 is a front elevational view in section illustrating solely the upper and lower molding body portions of the apparatus shown in FIG. 1.
Figure 5:
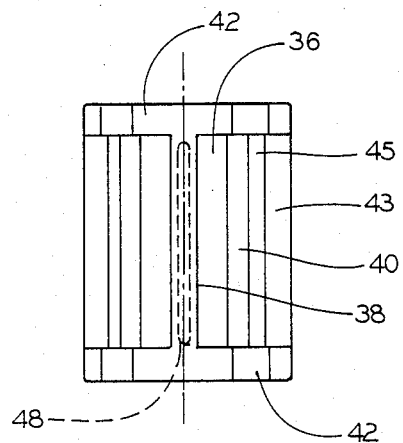
FIG. 5 is a top plan view of that portion of the apparatus shown in FIG. 4.

The upper portion 32 of molding body 30 is provided with two longitudinally extending reservoirs or troughs 36 which receive the flow of glass from a respective tray 12 or 22. The troughs 36 are separated from one another by a longitudinally extending divider wall 38. Upper molding body 32 includes a pair of outwardly diverging wall means 40 which receive the over-flow of the glass mass supplied to the troughs 36. As best seen in FIGS. 4 and 5, upper body portion 32 preferably is supported upon the lower body portion 34 by a pair of end walls 42 which rest upon a top flange portion 43 provided on lower body portion 34. The width of diverging wall means 40 at their lower ends is less than width of the top opening of lower body portion 34.

The lower end of each wall or surface 40 may terminate in a vertically directed lip portion 41 which extends downwardly into a recess or channel 45 formed in flange portion 43 of lower body portion 34. The inwardly disposed wall of channels 45 includes a lip 47. As the initial flow of glass from walls 40 is established, each channel 45 must be filled prior to establishing any flow over the lip 47. Therefore, the overflow from channel 45 is directed over lip 47 onto the inwardly converging walls 46 provided in lower body 34.

Channels 45 provide, in effect, a secondary holding bath or reservoir for the glass mass and serve to permit further precipitation or separation of any solid impurities inadvertently carried in the glass flowing from the initial reservoir formed by troughs 36.

Further, since the glass mass flowing down walls 40 must flow under lip 47 prior to reaching walls 46 of the lower body portion, this path of glass flow provides a means to regulate the rate of cooling of the glass mass as it flows downwardly toward the outlet 48 in lower body portion 34.

As the glass mass flows downwardly upon inwardly converging walls 46, the separate flows of glass from each trough 36 and channels 45 joins to form one glass sheet prior to exiting through outlet slot 48 provided in the lower portion of body 34. The width of outlet slot 48 is substantially equal to the thickness of the glass sheet to be formed. The width of the glass sheet is determined by the horizontal length dimension of the walls 40 and 46 and of outlet slot 48.

Walls 40 and 46 form the working surfaces during initial processing of the glass and the specific dimensions and angle at which the walls are formed have a direct influence upon maintaining the desired temperature, cooling rate and viscosity for the glass mass as it flows downwardly from trough 36 and eventually out of outlet 48.

As illustrated in FIG. 1, the merged sheet or hot ribbon of glass emerging from outlet 48 is then basically treated conventionally by passing between appropriate support rollers such as at 50 to a conventional refrigerator, indicated generally at 49.

In utilizing the apparatus shown in FIG. 1 in accordance with the method of the present invention, each glass furnace 10 and 20 is preferably filled with glass compositions which exhibit different properties in accordance with the desired application. For example, in a particular application a relatively thin coating of an expensive glass composition having special properties can be joined with a conventional less expensive glass composition forming the bulk of the particular sheet to be formed. For other applications one may wish to use glass compositions of different color such that the one side of the sheet is a different color from the opposite layer, or one layer may be colored or tinted with the other being transparent.

The flow of glass from each furnace to a respective one of troughs 36 is controlled by a conventional gate or valve such as indicated at 14. Therefore the flow from each trough 36 onto a respective one of the diverging walls 40 can be controlled which also functions to control the thickness of the respective layers of the glass sheet which is formed. Prior to beginning the glass flow, burners such as 16 and 18 are used to heat the area surrounding exit opening 48. Warm air then flows upwardly to warm both the bottom and top molding body portions. A concave roof portion 31 provided on top molding body portion 32 tends to trap this warm air. This provides a means to heat the walls 40 and inwardly diverging walls 46 to a uniform initial temperature.

In line with conventional procedure several burners such as 16 and 18 may be used and their angles can be adjusted to obtain the appropriate temperature desired. After the process has begun, the extra burners such as 16 and 18 may be adjusted or turned off when they are no longer needed.

Upon opening of the gates or valves 14, the flow of the glass mass into troughs 36 begins. As the troughs 36 overflow, the glass mass flows down the working surfaces of walls 40 and 46 to merge just prior to exit opening 48.

The single hot ribbon of glass exits from outlet 48 and is engaged by conventional rollers such as at 50 which guide and manipulate the hot ribbon and provides support prior to entry to a conventional water cooled refrigerator system 49. Additional conventional rollers also support the glass exiting from the refrigerator 49 where it can be manipulated onto another set of rollers 51 conventionally made of graphite or other appropriate material. Rollers 51 function to change the direction of movement of the ribbon to horizontal and lead to a conventional annealing furnace, such as indicated at 52. Upon appropriate annealing treatment the ribbon may be conventionally cut at the desired length to form specific sheet glass products. The resulting product is a single glass sheet formed from two distinct layers of glass. One example of an application of sheet glass made by the method described above is the formation of sheet glass having one layer comprising an infra red reducing composition. Many other practical applications are possible employing the method and apparatus of the present invention.

It should also be noted that the configuration of the molding body 34 lends itself to excellent control of the temperature gradient of the glass mass flowing down the wall means 40 and 46 and therefore provides the capability to produce glass of excellent quality. By employing different angles and dimensions, the glass mass is permitted to flow over a longer or shorter path which effects the rate of cooling and the viscosity of the glass mass. This design of the molding body permits a relatively less complex and less expensive feeding channel from the glass furnace to be used compared to those necessary in prior art sheet forming apparatus and contributes to reducing the overall cost of installation of such equipment.

Further, variations of thickness or width dimensions of the glass sheet product may be more easily and quickly changed compared to prior processes by merely removing the upper and lower molding body portions and replacing them with another as desired.

With reference to FIG. 2, another embodiment of the present invention is shown in which double glass panels are simultaneously formed in a continuous process. The similar components of the apparatus shown in FIG. 2 as compared to those shown in FIG. 1 carry the same reference numerals with the addition of the small case letter a to indicate this general similarity.

The embodiment of FIG. 2 includes provision of two furnaces 10a and 20a with the same feeding system and gate valve as indicated in FIG. 1. However, it should be noted that it is unnecessary to use two furnaces or use different compositions if it is not desired to form an end product utilizing different compositions.

Figure 7:
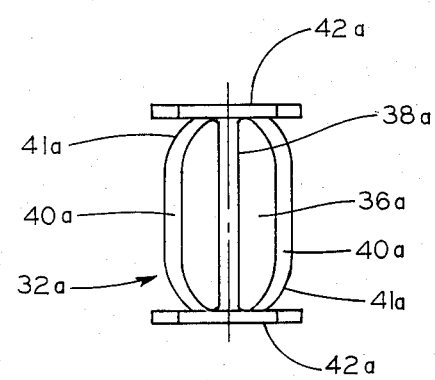
FIG. 7 is a top plan view of only the upper molding body portion shown in FIG. 6.
Figure 6:
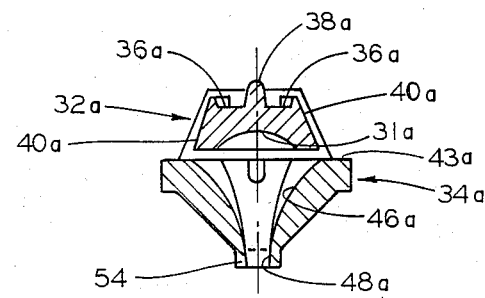
FIG. 6 is a front elevational view in section illustrating the upper and lower body portions of the apparatus shown in FIG. 2.
Figure 8:
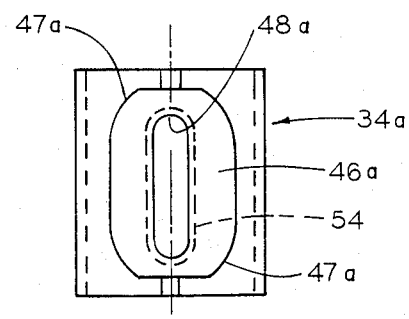
FIG. 8 is a top plan view of the lower molding body portion shown in FIG. 6.

Further, it should be noted that troughs 36a are shown separated by the divider 38a. However, the divider 38a is only necessary if separate glass compositions are to be used. A molding body 34a includes upper molding body portion 32a which is provided with working surfaces in the form of downwardly diverging wall means 40a. However, the configuration of the walls 40a is different compared to the embodiment in FIG. 1. As best seen in FIGS. 6, 7 and 8, each wall 40a is curved inwardly as it approaches the terminal end portions 41a. In a similar manner, inwardly converging walls 46a in lower molding body portion 34a are tapered or curved inwardly as they approach their longitudinal end sections 47a. The shape of the outer ends of the walls 40a and the top opening and shape of the walls 46a in lower body portion 34a are related to the desired configuration of the double glass panels to be formed.

Another difference between the embodiment in FIG. 2 as compared to FIG. 1 will be noted in the shape of the outlet opening 48a. It is also provided with end portions that are contoured to substantially the same geometrical configuration desired for the outer ends of the double glass panel formed. Outlet opening 48a is also provided with a curved extensions 54 at each end which conforms to the configuration of the outer end portions of the double glass panel formed. These extensions 54 are important to provide additional surface area for the end portions of the glass panel being formed as will be described later herein.

Figure 10:
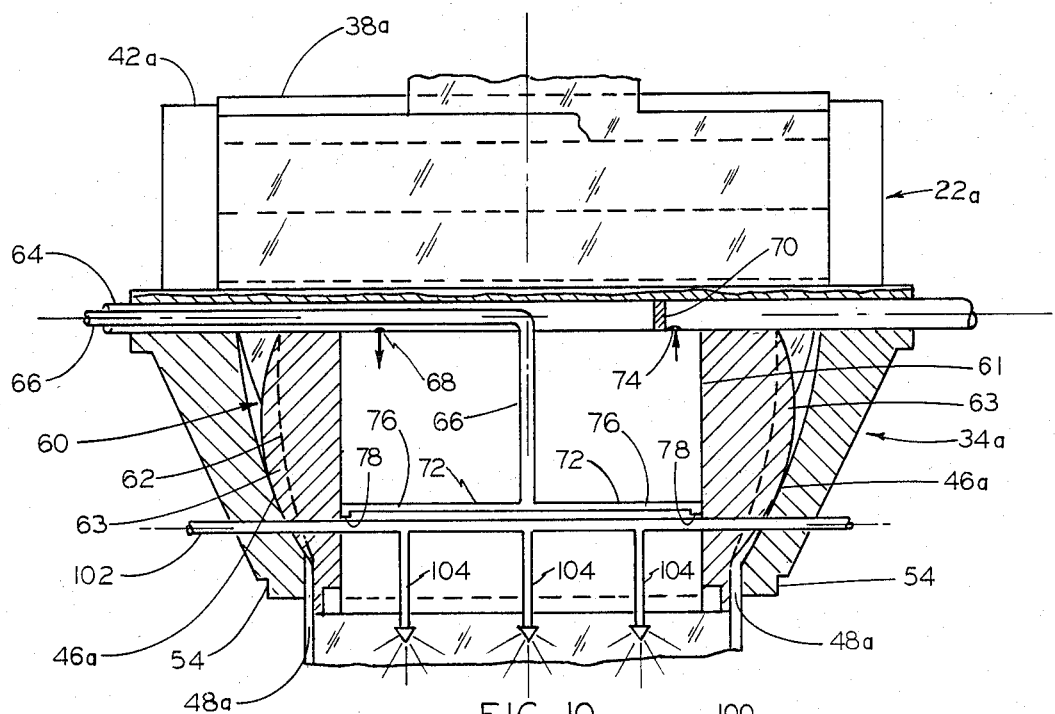
FIG. 10 is a side elevational view in section of that portion of the apparatus of FIG. 2 illustrated in FIG. 9, the section being taken along line A-B-C-D in FIG. 9.

Specific reference to FIGS. 2 and 10 illustrate a nozzle portion which is provided and disposed within the lower body portion 34a. This nozzle indicated generally at 60 includes a generally rectangular metal box or enclosure 61 which is protected by a covering of appropriate refractory material indicated at 62. Metal portion 61 includes provision for circulation of air and cooling water as will be described later in detail herein.

Figure 9:
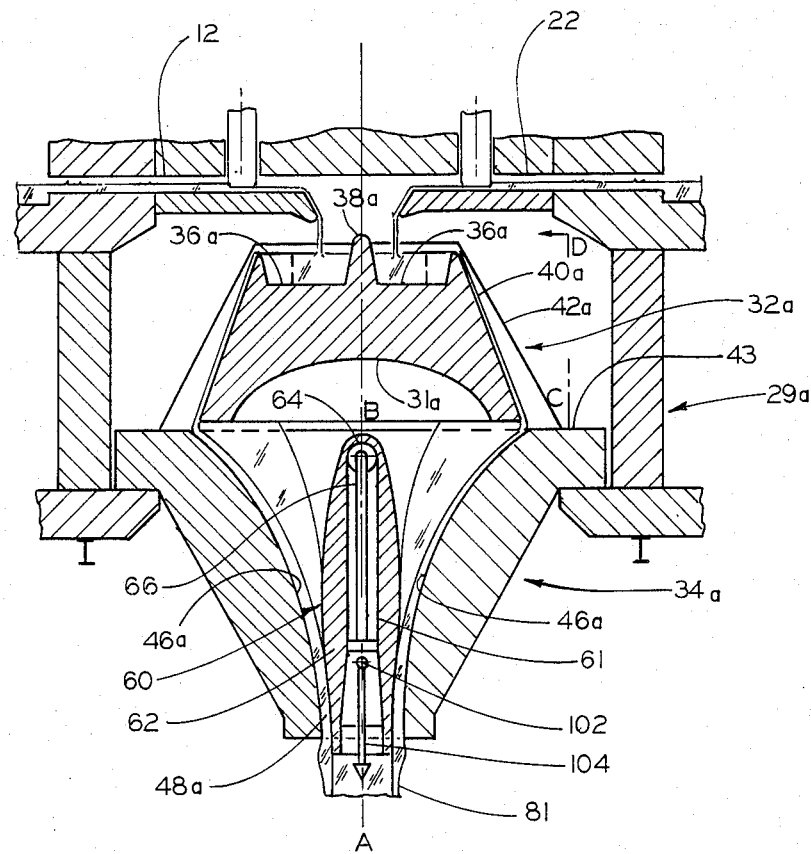
FIG. 9 is a front elevational section view similar to the view shown in FIG. 2.

The configuration of the outer protective ceramic hull 62, as shown in FIGS. 9 and 10, is designed according to the appropriate configuration of the double glass panel desired. The desired thickness of the walls of each of the glass panels can be conveniently controlled by the varying shape of the ceramic refractory hull which surrounds the metal nozzle 61 to control the space between the walls 46a and the hull 62 through which the glass mass must pass prior to reaching outlet 48a.

Therefore, the thickness and shape of the individual panels formed can be changed by merely changing the ceramic hull portion 62 which is adapted to fit around the rectangular portion 61. The use of an asymmetrical ceramic hull permits double panels to be formed in which the panels may be of different thickness or shape, see FIG. 15. In appropriate cases the rate of feed of the glass mass will be adjusted to obtain a proper amount of glass mass flowing into the lower molding body portion to assure that the designed final dimensions are achieved.

Figure 11:
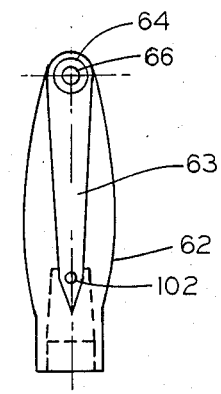
FIG. 11 is an end elevational view illustrating only the hull portion of the nozzle means shown in FIGS. 9 and 10.

Preferably hull 62 is provided with a pair of tapered rib-like extensions 63 formed at each end, as shown in FIGS. 10 and 11. As best seen in FIG. 10, extensions 63 contact the inner walls 46a and therefore tend to support part of the weight of the nozzle means which also is supported by water conduit 64. Also, extensions 63 aid in maintaining the hull 62 in the appropriate vertical position within lower molding body portion 34a.

The metal box or enclosure 61 includes an inlet conduit 64 for water provided with an inner conduit 66 which carries air. The larger diameter water conduit 64 includes an outlet 68 to provide cooling water into the enclosure 61. A plug 70 separates the inlet water from the outlet 74 through which the water may exit via an extension of conduit 64. The cooling water, it can be readily seen, may circulate through enclosure 61. The metal bottom 72 seals the water flow within the confines of enclosure 61 except for egress from outlet 74.

Air conduit 66 includes a right angle extension passing through a sealed opening in conduit 64 and extends downward through bottom or floor 72. Preferably a channel 76 is provided communicating the air flow to outlets 78 disposed toward the outermost ends of floor 72 to direct the air flow initially adjacent to the outer end portions of outlet opening 48a. Air supplied to conduit 66 preferably contains a very low moisture content and is directed into the space between the double panels being formed as will be referred to later herein.

The glass mass contained in troughs 36a is separated and flows downwardly along the working surfaces of walls 40a and then onto the working surfaces of walls 46a in bottom body portion 34a. The contour of walls 40a and 46a direct the separated glass flows downwardly toward the space formed between walls 46a and the ceramic hull 62.

As the separated flow of the glass masses progressively work downwardly, the end portions will join one another prior to reaching outlet 48a. With the glass flow joining at each longitudinally disposed end of the hull 62, the middle portions are maintained separate by the configuration of hull 62 and the dimensions and configuration of the walls 46a and the outlet opening 48a. During this time, the glass flow is progressively cooled at a controlled rate such that as it exits outlet 48a, it has reached a temperature at which it will maintain its shape.

The extended lip portion 54 which surrounds the outer longitudinally spaced ends of nozzle 60 function to provide an additional degree of working surface for each end portion of the glass mass to assure that sufficient cooling has occured to maintain the desired configuration of the glass panels being formed.

Air suppled via conduit 66 is directed into the space between the double panels 81 to equalize atmospheric pressure when the formed double panel will become exposed upon exiting outlet 48a.

Conventional support and transport systems including watercooled refrigerators may be employed to handle and process the double panels 81 in a conventional manner. Such a system is indicated generally at 83 and 85 in FIG. 2. A pair of pressure rollers which are mounted for reciprocal horizontal movement, such as indicated at 87, may be employed to force the panels 81 together to form a partially sealed upper and lower edges of the double glass panel at a predetermined dimension. After further suitable cooling, each section of the panels formed between such depressed portions, such as indicated at 89, may, after annealing, be cut in conventional fashion.

Figure 12:
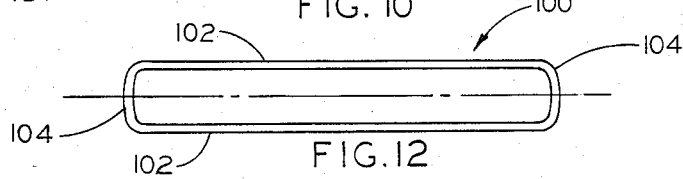
FIG. 12 is a top plan view of a typical glass product obtained employing the apparatus shown in FIGS. 9 and 10.

The top plan view shown in FIG. 12 represents a typical double panel configuration simultaneously formed in accordance with the present invention. As represented in FIG. 12, the double panel indicated generally at 100 includes a pair of side walls 102 which are joined at opposing ends by end walls 104.

If it desired, it is possible to design the configuration of the ceramic hull 60 and lower molding body portion 34a to provide a double panel having a specific configuration in the end wall portion 104. For example, a recess or groove or a outwardly ending lip may be provided as desired. In such cases, appropriate rollers located adjacent to exit opening 48a could be employed to aid the formation of such shapes as well as typically aid in supporting the glass product in the conventional sense.

Figure 13:
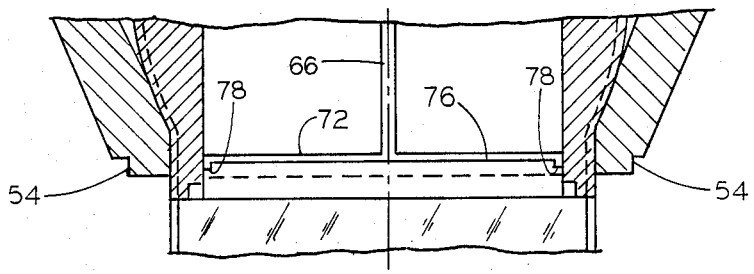
FIG. 13 is a side elevational view in section of a portion of a modified embodiment of the apparatus shown in FIG. 10.
Figure 15:
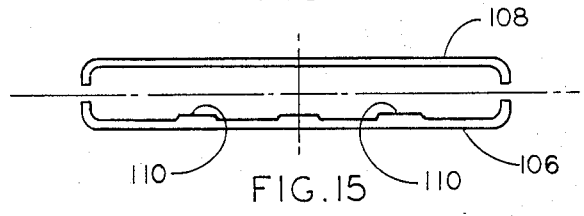
FIG. 15 is a top plan view illustrating the modified end product obtained employing the embodiment shown in FIG. 13.
Figure 14:
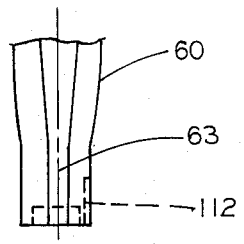
FIG. 14 is a partial end elevational view similar to the view in FIG. 11 illustrating the modified ceramic hull shown in FIG. 13.

With specific reference to FIGS. 13-15, a modification of the embodiment shown in FIGS. 2 and 10 is illustrated wherein the double panels simultaneously formed are not connected and form two independent flanged panels 106 and 108 as seen in FIG. 15.

To illustrated an additional advantage of the present invention, panel portion 106 is provided with thickened reinforcing portions, such as 110, to provide added strength to the panel. Such separate panels may be advantageously used for construction applications as wall sections, particularly when high strength glass-ceramic compositions are used.

To produce the panels 106 and 108, ribs 63, as shown in FIG. 14, are made with a different configuration and extend the entire length of the hull 60. This construction prevents the separate flows of the glass masses progressing downward from joining one another as earlier described in the other embodiment so that two separate panel sections are formed.

Reinforcing sections 110 are formed by providing appropriate recesses, such as illustrated at 112 spaced along the side of ceramic hull 60 and located adjacent to exit opening 48a.

From the foregoing description, it should be readily understood that the described method and apparatus provides a continuous process to form a double panel or the like in a simultaneous manner. The length and width dimensions as well as the distance between the major portion of width and length can be controlled within relatively reasonable limits for most commercial applications.

The apparatus of the present invention not only provides means to simultaneously form a double glass panel, but further provides for such a panel to be formed wherein each side of the panel may be formed from a distinct and different glass composition. This option opens up many possibilities for utilizing a different composition for one panel of the double panel which has desirable characteristic not necessary to use in the opposing panel.

Now referring specifically to FIGS. 3 and 16-21, another preferred embodiment of the present invention is shown for manufacturing tube configurations.

Those portions previously described which are identical are identified by the same reference numeral and those portions which are similar but modified relative to this embodiment are referred to with the same reference numeral and the letter "b".

With reference to FIG. 3, a pair of glass furnaces 10 and 20 are similarly communicated to a pair of reservoirs 36b provided in an upper molding body portion 32b via feeding channels 12 and 22 provided with gate valves 14. It should be pointed out that the use of separate furnaces and feeders and a divider 38b are not necessary if two distinct glass compositions are not to be used to form the tube end product. However, other than the formation of a tube with dissimilar glass compositions in each half thereof, the method and apparatus functions the same when a single reservoir is employed without the divider 38b.

Upper body portion 32b is generally cone-shaped and is provided with the reservoirs 36b, divider 38b and outwardly sloping walls 40b forming working surfaces which receive the glass mass overflow from respective reservoirs 36b.

Body portion 32b includes a pair of support legs 80 which are extensions of divider 38b such that the glass mass overflow is blocked from flowing down the outer portion of the legs and is directed to the sloping walls 40b.

Figure 16:
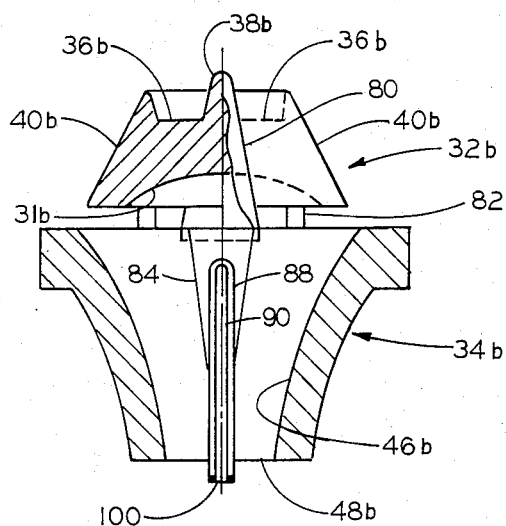
FIG. 16 is a side elevational view of the upper and lower molding body portion of the embodiment shown in FIG. 3, the section being taken along the centerline of the apparatus.
Figure 18:
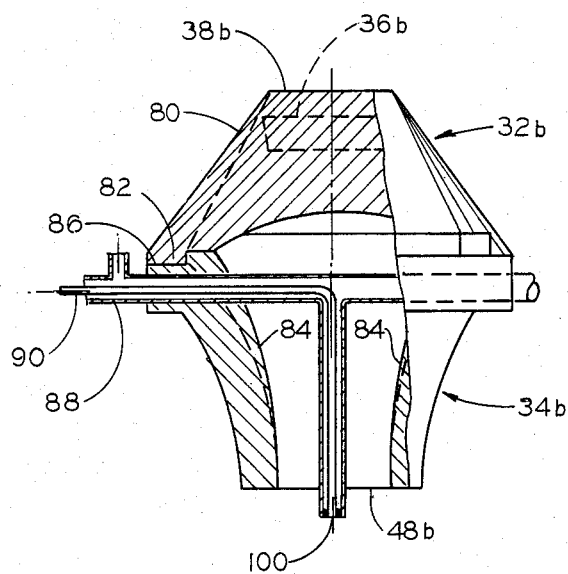
FIG. 18 is a side elevational view, partially in section, taken at right angle to the view shown in FIG. 16.
Figure 17:
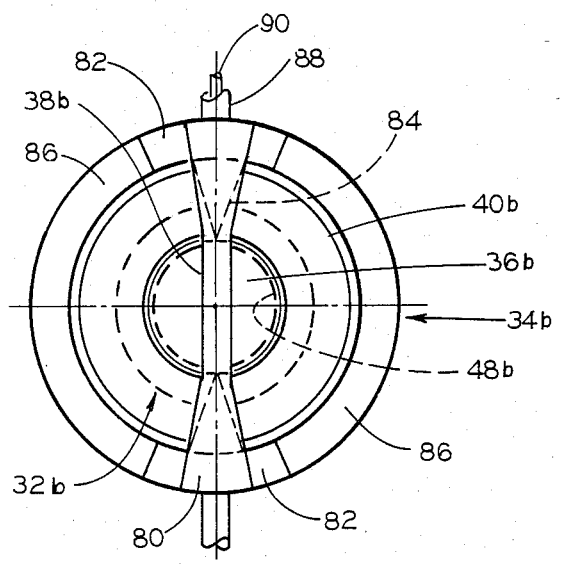
FIG. 17 is a top plan view of the apparatus shown in FIG. 16.
Figure 19:
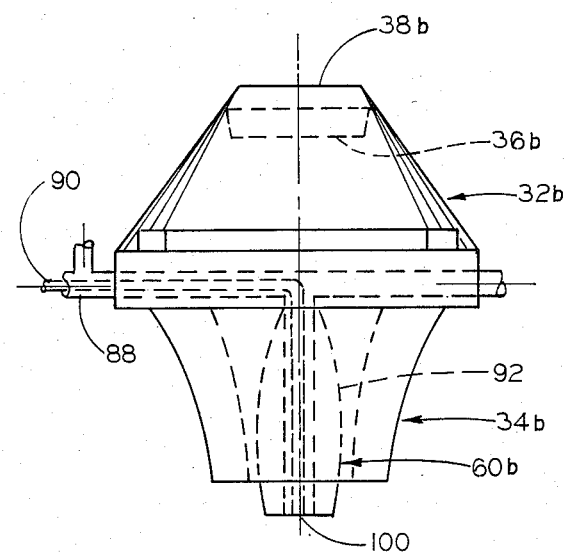
FIG. 19 is a side elevational view similar to the view shown in FIG. 16, but including an illustration of the ceramic hull which is not shown in FIG. 16.

Preferably, each leg 80 increases in width in a progressively downward manner and includes a wider flange portion forming a stabilizing foot 82. Referring specifically to FIGS. 16-18, foot portion 82 is formed in a stepped fashion having a first level resting upon the top surface of one of the tapered ribs 84 which are formed as an extension of the inner wall surface of lower molding body portion 34b. The lower level of foot 82 rests upon a lip 86 provided on the outer surface of lower body portion 34b. Legs 80 therefore function to stabilize and correctly position upper molding body 32b upon lower molding body portion 34b.

Lower molding body portion 34b has a generally conical configuration with an upper opening having a slightly larger dimension that the horizontal extent of walls 40b so that the glass mass flowing downwardly upon walls 40b will fall upon the inner wall surfaces 46b of body portion 34b. The ribs 84 are tapered with their widest dimension at their upper ends and are of generally wedge-shaped configuration. Ribs 84 terminate at a point above outlet opening 48b approximately at or near the point where inner walls 46b are substantially vertical and approximately equal in diameter to opening 48b.

The glass mass from the working wall surfaces 40b which is communicated to the inner working wall surfaces 46b is divided as it flows from the separated reservoirs 36b until the termination of ribs 84. At this point, the divided flow of the glass masses joins as it continues downwardly toward outlet 48b to form an enclosed tube like shape.

A nozzle means indicated generally at 60b is provided and supported within lower body portion 34b. Conventionally, nozzle means 60b provides a source of cooling water through T-shaped conduit 88 and air via conduit 90. Preferably the nozzle includes a protective cigar-shaped ceramic hull 92. Air via conduit 90 is separately communicated through an outlet 100 in the bottom of the nozzle means 60b and into the hollow space of the glass tube formed which emerges from outlet 48b to aid in maintaining the shape of the tube. Of course, outlet 100 is provided with seal to prevent any communication with water in conduit 88 which is circulated through conduit 88.

With respect to FIG. 3, the hollow glass tube 94 emerging from outlet 48b is conventionally manipulated by rollers 96 as it travels to a conventional refrigerator indicated at 98. The tube formed may then be conventional cut or processed further as desired after annealing. Nozzle means 60b may be of similar construction materials to nozzle means 60a however it has a different configuration.

Figure 20:
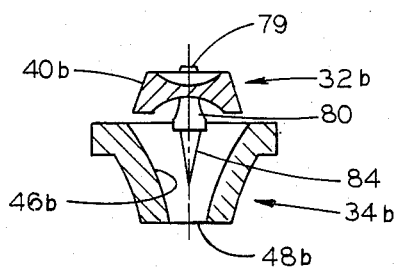
FIG. 20 is a side elevational view of a modified embodiment of the upper and lower body portions of the embodiment shown in FIGS. 16 and 17.
Figure 21:
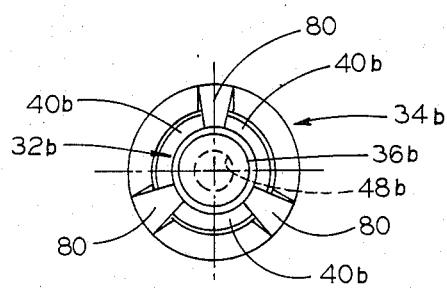
FIG. 21 is a top plan view of those modified portions of the apparatus shown in FIG. 20.

A modified upper and lower molding body portion is illustrated in FIGS. 20 and 21 in which an example of a tube forming apparatus constructed in accordance with the present inention is shown wherein three legs 80 are employed and divider 38b is eliminated so that only a single reservoir 36b is formed. The use of more than two legs may be desirable when a relatively large diameter tube is to be made and the size of the apparatus tends to require additional stability to adequately support top molding body 32b upon the lower body 34b. However, when three or more legs are used, a stabilizing foot, such as 82, is not necessary.

The flow from the single reservoir 36b in the embodiment of FIGS. 20 and 21 is directed to the working wall surfaces 40b between legs 80 which are provided with an extension 79 to contain and direct the overflow of the glass onto the walls 40b. In all other respects the operation and formation of the glass tube is the same as previously described.

It may be desirable to employ a slight modification of the design of the air and water conduit 88 and 90 when the three legged design shown in FIGS. 20 and 21 are used. To assure good stability of the ceramic hull 92, it would be desirable to employ an addition extension of conduit 88 through the third leg which extension would also communicate circulating water out through the system.

From the foregoing description, it should be readily understood that a novel method and apparatus for forming a glass or glass-ceramic sheet, double panel or tube is disclosed which possess significant advantages over prior art methods and means.

As an auxiliary benefit, FIGS. 9 and 10 include the illustration of the provision of a separate conduit 102 having plurality of nozzles 104 extended below the outlet opening 48a. If desired, the method and apparatus disclosed herein can be readily adapted in such a manner to provide a spray coating upon one or both of the interior surfaces of the double glass panels formed using the embodiment described in FIG. 2.

The nature of the coating employed may be any which can be applied via a fluid spray from the nozzles 104.

What is claimed is:

1. An apparatus for the continuous production of glass articles of sheet or tube form comprising in combination, a molding body having an upper and lower portion, said upper portion including a pair of diverging walls forming working surfaces and a reservoir means for receiving a molten glass mass supply disposed above said diverging walls, the overflow of said glass mass from said reservoir means communicating with the upper portion of a respective one of said diverging walls to flow downwardly on said walls; said lower portion of said molding body supporting said upper portion and including an inner cavity having inwardly converging walls means, the upper opening of said cavity being greater than the greatest width dimension between the diverging walls of said upper portion to communicate the glass mass flowing from said upper portion to the converging walls of said lower portion, the lower end of said inwardly diverging walls of said lower portion terminating in an outlet conforming to the approximate shape and size of the glass article to be formed; and a recess in said lower portion forming a second reservoir means extending along the edges of said inner cavity in communication with the glass mass flowing from said diverging walls of said upper portion of said molding body, said recess provided with a lower inner lip which directs the overflow of said glass mass in said recess to the converging walls formed in said lower portion of said molding body.

2. An apparatus for the continuous production of glass articles of sheet or tube form comprising in combination, a molding body having an upper and lower portion, said upper portion including a pair of diverging walls forming working surfaces and a pair of reservoir means each communicated to a distinct and separate feeder which in turn are communicated to separate glass mass supply furnaces, a divider wall disposed between said reservoir means and directing the overflow from each reservoir to a distinct and separated area of said diverging wall surfaces means to flow downwardly on said walls; said lower portion of said molding body supporting said upper portion and including an inner cavity having inwardly converging walls means, the upper opening of said cavity being greater than the greatest width dimension between the diverging walls of said upper portion to communicate the glass mass flowing from said upper portion to the converging walls of said lower portion, the lower end of said inwardly diverging walls of said lower portion terminating in an outlet conforming to the approximate shape and size of the glass article to be formed.

3. An apparatus for the continuous production of glass articles of sheet or tube form comprising in combination, a molding body having an upper and lower portion, said upper portion including a pair of diverging walls forming working surfaces and a reservoir means for receiving a molten glass mass supply disposed above said diverging walls, the overflow of said glass from said reservoir means communicating with the upper portion of a respective one of said diverging walls to flow downwardly on said walls; said lower portion of said molding body supporting said upper portion and including an inner cavity having inwardly converging walls means, the upper opening of said cavity being greater than the greatest width dimension between the diverging walls of said upper portion to communicate the glass mass flowing from said upper portion to the converging walls of said lower portion, the lower end of said inwardly diverging walls of said lower portion terminating in an outlet conforming to the approximate shape and size of the glass article to be formed; and including a narrow, generally rectangular nozzle means disposed within the inner cavity of said lower portion of said molding body and including an outer shell of predetermined curved configuration adapted to be received between the converging wall means of said lower molding body portion defining a path for the flow of the glass mass between said nozzle means and said converging wall means.

4. The apparatus defined in claim 3 wherein said nozzle means and said outer shell have an elongated central portion wherein each side is substantially parallel to the other and curved end portions joining said parallel side portions, said outer shell cooperating with the diverging walls and the outlet of said lower molding body to form said glass mass flowing through said molding body into elongate double panels having closed end portions separated by an air space extending between said closed end portions.

5. The apparatus defined in claim 1 wherein said upper body portion includes a pair of reservoir means each communicated to a distinct and separate feeder which in turn are communicated to separate glass mass supply furnaces, a divider wall disposed between said reservoir means and directing the overflow from each reservoir to a distinct and separated area of said diverging wall surfaces, said converging wall surfaces disposed in said lower body portion having a configuration for receiving said distinct and separate flows of said glass mass from a respective reservoir and maintaining these distinct flows separate from one another until each reaches a predetermined position above said outlet.

6. The apparatus defined in claim 4 wherein said outer shell of said nozzle means includes a rib-like extension formed at each end thereof, said extensions engaging a predetermined area of said converging walls of said lower body portion.

7. The apparatus defined in claim 6 wherein said rib-like extensions of said outer shell extends downwardly to at least said outlet opening and have a configuration which prevents the separate glass masses flowing downwardly on a respective one of said diverging wall means of said lower body portion from joining one another.

* * * * *